P. P. GILLES.
FUEL FEEDING DEVICE FOR CARBURETERS.
APPLICATION FILED OCT. 14, 1918.
1,317,919.
Patented Oct. 7, 1919.
2 SHEETS—SHEET 1.
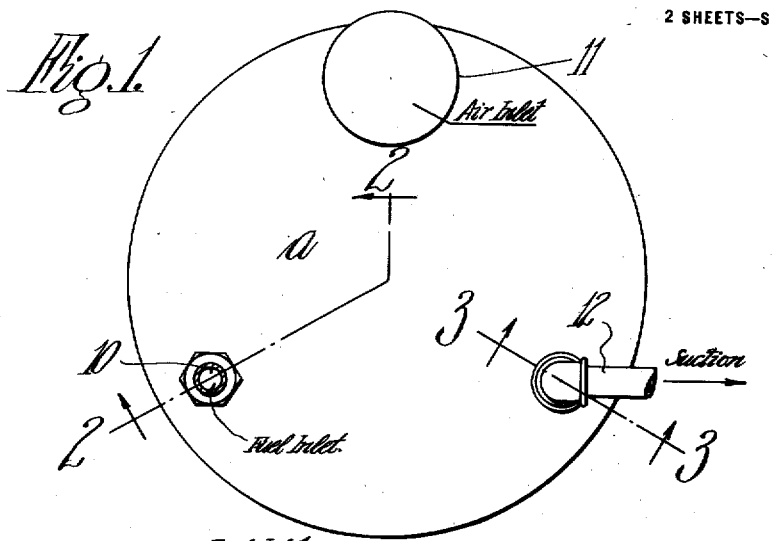
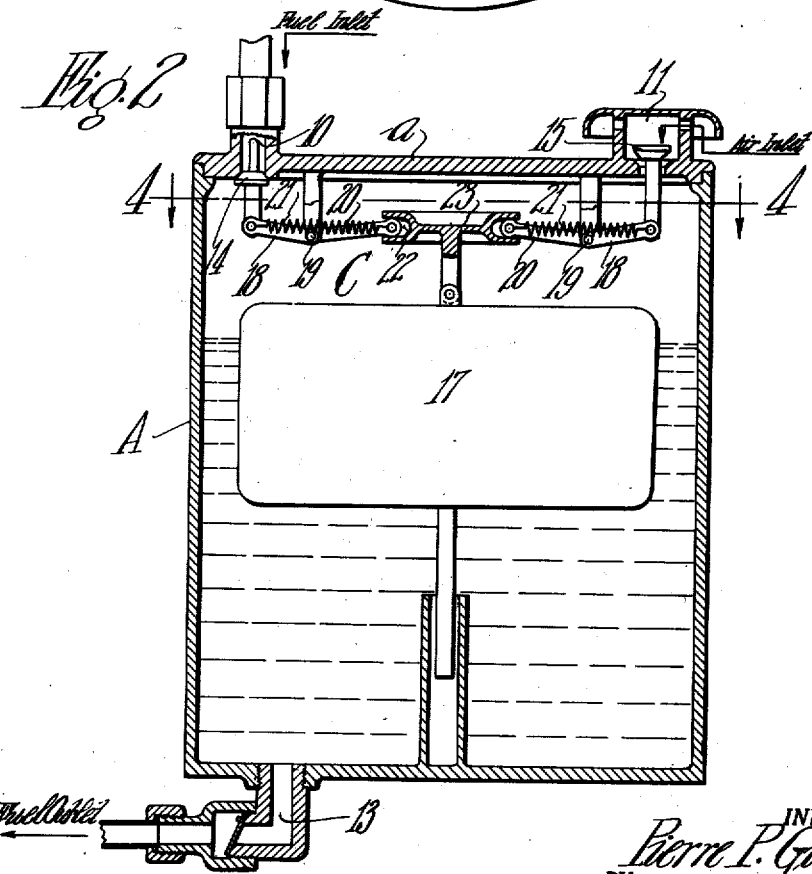
INVENTOR.
Pierre P. Gilles.
BY
Chapin + Neal
ATTORNEYS.

P. P. GILLES.
FUEL FEEDING DEVICE FOR CARBURETERS.
APPLICATION FILED OCT. 14, 1918.
1,317,919.
Patented Oct. 7, 1919.
2 SHEETS—SHEET 2.
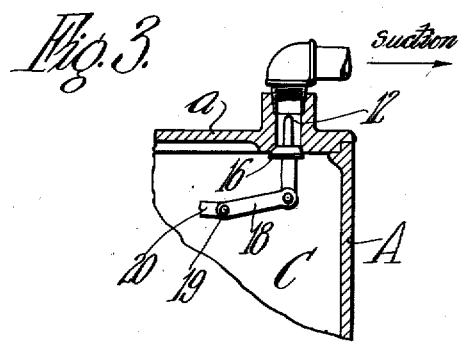
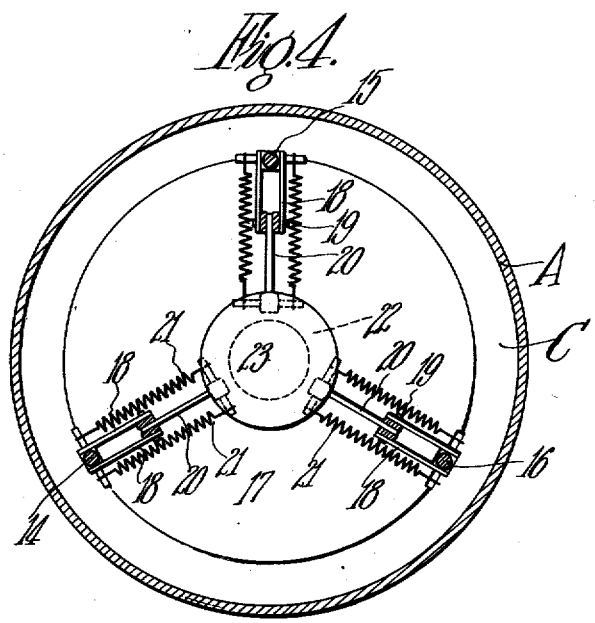
INVENTOR.
Pierre P. Gilles
BY Chapin + Neal
ATTORNEYS.

UNITED STATES PATENT OFFICE.

PIERRE P. GILLES, OF SPRINGFIELD, MASSACHUSETTS.

FUEL-FEEDING DEVICE FOR CARBURETERS.

1,317,919. Specification of Letters Patent. Patented Oct. 7, 1919.

Application filed October 14, 1918. Serial No. 258,092.

*To all whom it may concern:*

Be it known that I, PIERRE P. GILLES, born in Switzerland of German parentage, now believing myself to be a citizen of the Swiss Confederation, and having formally declared my intentions of becoming a citizen of the United States of America in conformance with the United States immigration laws, and now residing at Springfield, in the county of Hampden and State of Massachusetts, United States of America, have invented certain new and useful Improvements in Fuel-Feeding Devices for Carbureters, of which the following is a specification.

This invention relates to fuel feeding devices for carbureters and, more particularly to fuel feeding devices of the vacuum feed type which may be used to supply fuel from a low level supply tank to a carbureter. The invention, although capable of other uses, is particularly suitable as a fuel feeding means for the carbureters of automobiles and other self-propelled vehicles.

According to the general prior practice. fuel feeding devices of the class mentioned consist essentially of a fuel supply chamber; which is provided with an air inlet, a suction connection and a fuel inlet adapted for connection to the low level fuel tank; and a valve of valves to open the air inlet and close the suction connection, after sufficient fuel has been drawn by suction into the chamber from the low level tank, and to close the air inlet and open the suction connection, whenever the fuel in the chamber falls below a given level due to the gravity discharge of fuel from the chamber to the carbureter. The arrangement described has proved generally satisfactory, but experience has shown that at certain times there may be a flow of fuel into the supply chamber when such flow is not desired. Thus, where in an automobile the fuel supply chamber and the low level fuel tank are located at not greatly different levels, it may frequently happen that the low level tank will lie at a higher level than the fuel supply chamber when the automobile is on a down grade. Therefore, even though the suction connection to the fuel supply chamber be closed, fuel may, at such times, flow by gravity into the chamber and, since the air inlet is, at such a time, open, fuel may be splashed through the air inlet or otherwise pass therefrom if such gravity flow of fuel sufficiently raises the level of fuel in the chamber. The difficulty described is of course accentuated where the fuel supply chamber is located closely adjacent to or is attached to or made integrally with, the carbureter, for in such instances, the maximum difference in level obtainable between the fuel supply chamber and the low level tank is limited and must needs be much less than where the fuel supply chamber is separate from the carbureter and therefore capable of being located at any desired level. The difficuty described also results to a certain extent from the splashing of fuel in the low level tank, due to vibration and the jars and jolts experienced when the automobile is operated over rough roads. From time to time fuel may be splashed from the low level tank so as to lodge in the fuel feed pipe and thereafter pass to the supply chamber by gravity flow.

This invention is concerned with the elimination of the difficulties described and has for its object to provide in a fuel feeding device for carbureters, a valve to automatically and positively open and close the fuel inlet, and to open the latter when the fuel in the supply chamber has fallen to a predetermined level and to close the inlet when the chamber has been filled with fuel to a predetermined level.

According to this feature of the invention the flow of fuel to the fuel supply chamber is positively prevented at all times except when such flow is desired, as for example when the suction valve is open. When the latter is open it matters not whether fuel then flows by gravity or is drawn by suction to the chamber, for as soon as the chamber has been filled with fuel to the desired level, the fuel inlet is positively closed. The supply chamber cannot therefore become flooded and, as long as the fuel is prevented from rising beyond a predetermined level in the chamber, there is no danger of fuel being splashed from, or otherwise leaving, the chamber through the open air inlet.

Other objects and advantages will appear in the following description and in the illustrative embodiment of the invention in the accompanying drawings, in which:

Figure 1 is a top plan view of a fuel feeding device embodying the invention,

Figs. 2 and 3 are sectional elevations thereof taken on the lines 2—2 and 3—3, respectively, of Fig. 1; and Fig. 4 is a sectional plan view taken on the line 4—4 of Fig. 2.

Referring to these drawings, the fuel feeding device includes a suitable casing A, which is preferably provided with a cover portion $a$ so applied to the casing as to render it air-tight, or substantially so. The interior of the casing is designated C and constitutes a substantially air-tight chamber, which will hereinafter be termed the fuel supply chamber.

There is provided in the cover $a$ a fuel inlet 10, an air inlet 11, and a suction connection 12, all of which, as illustrated in Figs. 2 and 3, communicate with the air space of chamber C. The fuel inlet 10 is adapted to be connected to a low level fuel supply tank, and the connection 12 is adapted to be connected to a suitable suction means, all in a manner now well-known in the art. The chamber C also has a fuel outlet 13, which is provided in the casing A and is adapted for connection with a carbureter in any suitable manner so that fuel may flow from the chamber to the carbureter by gravity.

The fuel inlet 10, the air inlet 11, and the suction connection 12 are provided with valves 14, 15, and 16, respectively. Each of these valves is arranged for automatic and substantially simultaneous operation by means controlled by the level of fuel in the chamber C. Thus, a float 17 is provided in the latter and between the float and each of the described valves are connections, such as will actuate them upon rising or falling of the float. For example, each of the three valves may be supported by the free ends of a pair of spaced arms 18 which are loosely fulcrumed on a rod 19, supported by cover $a$. Also fulcrumed on rod 19 and between arms 18 is an arm 20, the free end of which is connected by a pair of springs 21 with the free ends of arms 18. The free ends of all three of the arms 20 lie in a circumferential groove 22 formed in a disk 23 which is rigidly attached to the float 17.

The connections between the float and valves are preferably such that each of the three valves is sharply and suddenly actuated from the gradual rise and fall of the float rather than gradually with such rise and fall. Thus, considering Fig. 2, as the float falls, the arms 20 are gradually lowered, but without moving the arms 18. When, however, the arms 20 have been lowered to such an extent that the springs 21 cross from above to below the centers of rods 19, the arms 18 will be suddenly moved downwardly to actuate the valves. Thus, the valves are suddenly and simultaneously moved in one direction when the fuel in chamber C has fallen to a predetermined level. Similarly, the valves will be suddenly and simultaneously actuated in the other direction after the chamber C has been filled to a predetermined level with fuel.

The valves 14 and 16 are so arranged as to close the fuel inlet 10 and suction connection 12, respectively, on an upward swinging movement of their arms 18, or in other words upon rising of the float. The air valve 15, however, is so arranged as to open on an upward swinging movement of its arms 18 and to close on a downward swinging movement. Thus, the air valve 15 and the suction valve 16 operate reversely so that chamber C is alternately placed in communication with the atmosphere and the suction means. The fuel valve 14, however, operates similarly to the suction valve 16 so that, when the chamber C is cut off from communication with the source of suction, it is likewise cut off from the fuel supply. Therefore, no fuel can flow into chamber C at times when the air valve 15 is in open position, and the chamber C will not become filled to such a level that fuel can leave the chamber through the open air inlet 11.

The operation of the fuel feeding device will sufficiently appear from the foregoing description.

Although, according to the preferred and illustrated form of the invention, valves have been shown to control the suction connection and air inlet, it is recognized that these valves, although desirable, are not indispensable to the operation of a fuel feeding device embodying the present invention. The essential feature of the invention lies more particularly in the positive opening and closing of the fuel inlet, as a means for controlling the fuel level in the fuel supply chamber independently of such control as is, or may be, affected by regulation of the suction or air valves or both. According to the preferred embodiment of the invention, the control of the fuel inlet is largely a safeguard or precautionary measure taken to insure the effectiveness of the control of the fuel level in the supply chamber, which control may be largely effected by other means, but, according to the broad conception of the invention, the control of the fuel level in the supply chamber is capable of being effected by the fuel inlet valve alone. Although the fuel supply chamber has been described as supplying a carbureter, the term carbureter herein is thought of as meaning chiefly the atomizing devices or nozzles by means of which fuel is delivered into the intake manifold of the engine.

The invention has been disclosed, in an embodiment at present preferred, for the purposes of illustration, but the scope of the invention is defined by the appended claim rather than by the foregoing description.

What I claim is—

In a fuel feeding device for carbureters; a fuel supply chamber; an air inlet, a fuel inlet, and a suction inlet for the latter; valves for all three inlets; a float in the chamber; and means operable by the float to open the valves of the fuel inlet and the suction inlet and to close the valve of the air inlet when the fuel in the chamber has fallen to a predetermined level, all the valves being actuated simultaneously and substantially instantaneously.

PIERRE P. GILLES.